Oct. 10, 1933.    W. F. OCENASEK    1,930,319
FRICTION CLUTCH
Filed April 29, 1933    2 Sheets-Sheet 1

INVENTOR
William F. Ocenasek
BY
Pennie Davis Marvin & Edmonds
ATTORNEYS

Oct. 10, 1933.  W. F. OCENASEK  1,930,319
FRICTION CLUTCH
Filed April 29, 1933   2 Sheets-Sheet 2
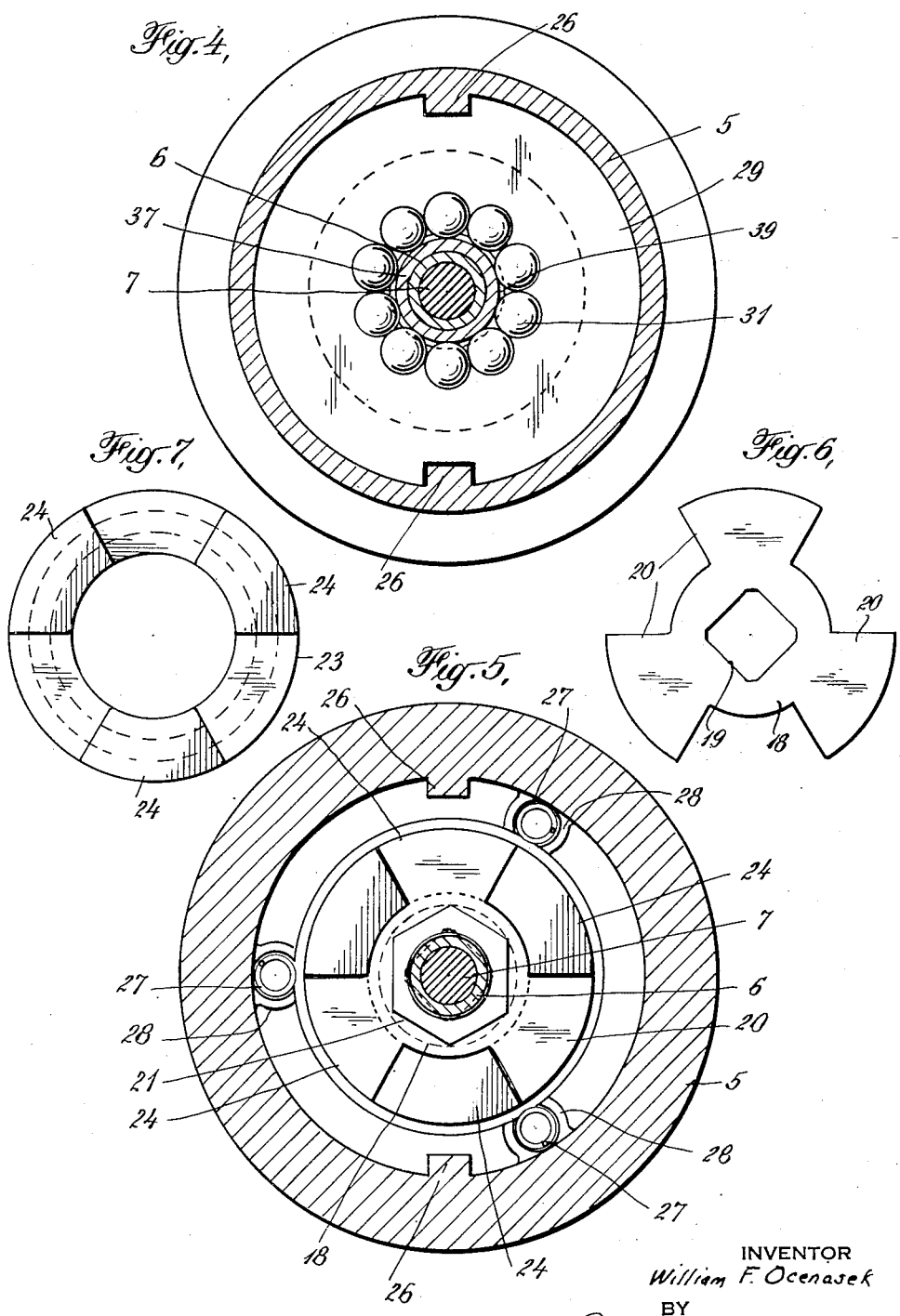
INVENTOR
William F. Ocenasek
BY
ATTORNEYS Patented Oct. 10, 1933

1,930,319

UNITED STATES PATENT OFFICE 1,930,319

FRICTION CLUTCH

William F. Ocenasek, Plainfield, N. J., assignor to Walker-Turner Company, Inc., Plainfield, N. J., a corporation of New York Application April 29, 1933. Serial No. 668,543

20 Claims. (Cl. 192—66)

This invention relates to power transmission devices and more particularly to a self-contained clutch unit adapted to be applied to a line shaft or similar power-driven element to facilitate and to control the transmission of power therefrom.

Power clutches have long been in use, but those available are bulky and complicated devices which must be assembled on the power-driven shaft. Such devices usually include means external to the clutch casing to apply pressure to the clutch elements, or they involve other complicated details of construction which make them useless for many purposes.

One of the objects of the invention is the provision of a simple, compact and efficient clutch adapted particularly for the transmission of light loads at high speeds, although by enlarging the parts the clutch may be utilized for loads of any size.

Another object is the provision of a clutch which can be applied to and removed from any shaft of given dimensions without disassembling the mechanism.

Further objects are the provision of simple and effective means to secure the maximum effective friction surface in the clutch, to hold the clutch elements in engagement and to facilitate the adjustment of the mechanism.

Other objects and advantages will be apparent as the invention is better understood by reference to the following specification and the accompanying drawings, in which Fig. 1 is a sectional view of the mechanism with the clutch elements engaged;

Fig. 4 is a section on the line 4—4 of Fig. 1;

Fig. 5 is a section on the line 5—5 of Fig. 1;

Fig. 6 is a plan view of the dog which actuates one of the clutch elements; and

Fig. 7 is a rear elevation of one of the clutch elements.

Figure 1:
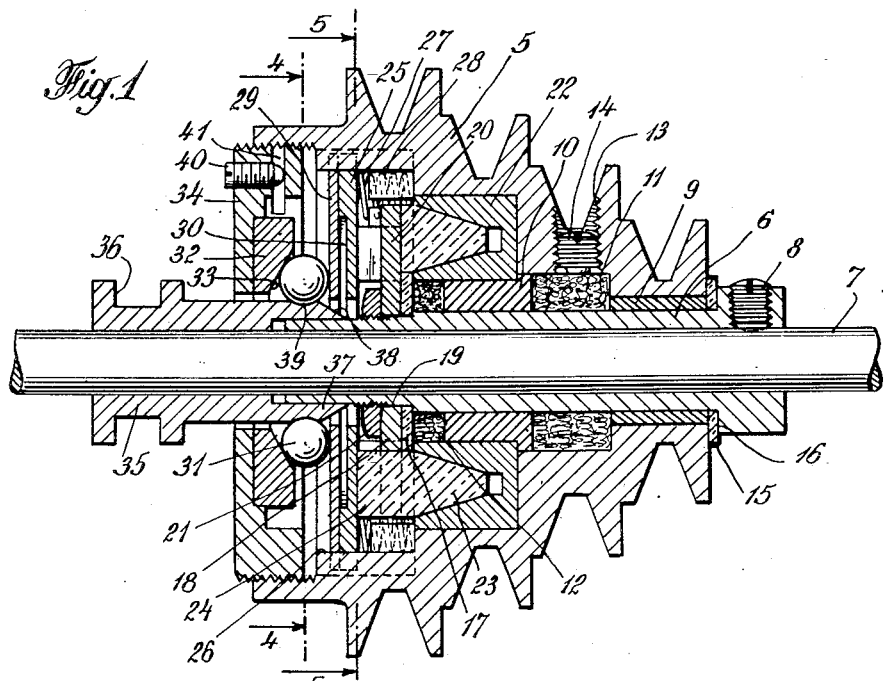

In the accompanying drawings, the clutch casing 5 is illustrated as embodying a four-step V-belt pulley. It may instead include any type of pulley, sprocket or gear for the transmission of power. The casing may be made of any suitable metal, but conveniently and economically may be a die casting, particularly where the casing takes the form of a pulley.

A sleeve 6 of steel or other suitable metal is mounted on the shaft 7 and is secured thereto by one or more set screws or other convenient fastening means 8. Bushings 9 and 10 of oilless metal or other suitable bearing material are mounted on the sleeve 6 for rotation thereon, and are firmly held in the casing 5 by friction. Rings of felt 11 and 12 are disposed about the sleeve, the former being adapted to be supplied with oil through an opening 13 which is normally closed by a screw 14. A fiber washer 15 is disposed at one end of the casing 5 adjacent a shoulder 16 on the sleeve 6, and a similar washer 17 of fiber or other suitable material is disposed adjacent the felt ring 12 near the opposite end of the sleeve.

A dog 18 having a squared opening 19 and three arms 20 is supported on the sleeve 6 adjacent the washer 17, the sleeve being squared at this point to receive the dog. The dog is secured by a nut 21 threadedly mounted on the sleeve. Thus the dog is caused to rotate with the sleeve 6 and shaft 7.

Figure 3:
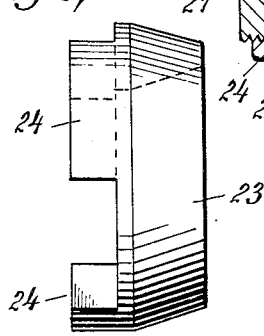
Fig. 3 is an elevation of one of the clutch elements.

Within the casing 5, a clutch element 22 having a V-shaped groove is secured with a friction fit, the clutch element being of any suitable metal, but preferably of cast iron. The clutch element 22 is adapted to receive a similarly V-shaped annular clutch element 23 which is molded of any suitable friction material, preferably a composition such as is used in brake linings and the like. The clutch element 23 as shown in Figs. 3 and 7 includes lugs 24 which are disposed between the arms 20 of the dog 18, so that the clutch element may move in the direction of the axis of the shaft 7 to and from engagement with the clutch element 22.

The rear ends of the lugs 24 on the clutch element 23 engage a friction plate 25 having notches to receive lugs 26 on the casing 5 so that the plate rotates with the casing and is movable in the direction of the axis of the shaft 7. Springs 27 are disposed in pockets 28 formed in the casing 5, and bear against the casing and the face of the plate 25, tending to move the plate toward the left in Figs. 1 and 2.

A resilient plate 29, preferably of spring steel and having notches to engage the lugs 26 on the casing 5, is disposed behind the plate 25 which, as illustrated in the drawings, has a recess 30. A plurality of balls 31 rest between the resilient plate 29 and a bearing member 32 having a sloping face 33. The bearing member 32 is supported in the adjustable wall 34 which is threadedly mounted in the casing 5.

A sleeve 35 having a notch 36 to receive an operating fork (not shown) is slidably mounted on the shaft 7 and has an end 37 with a beveled surface 38 and a ball race 39. The end 37 overlaps the sleeve 6 at the inner end thereof.

The plate 34 is locked in its adjusted position by a screw 40 threadedly mounted in the plate and bearing against the inner wall of a slot 41 in the threaded flange of the plate 34. By turning the screw 40 the threads on the plate 34 may be jammed in the corresponding threads of the casing 5, so as to securely lock the plate 34 against rotation. When the screw 40 is released, the plate 34 may be turned readily to adjust the position of the parts so as to secure the desired frictional contact and the proper transmission of power through the clutch. When once adjusted, no change is necessary until wear caused by operation of the mechanism may require the plate 34 to be slightly turned to take up such wear.

Figure 2:
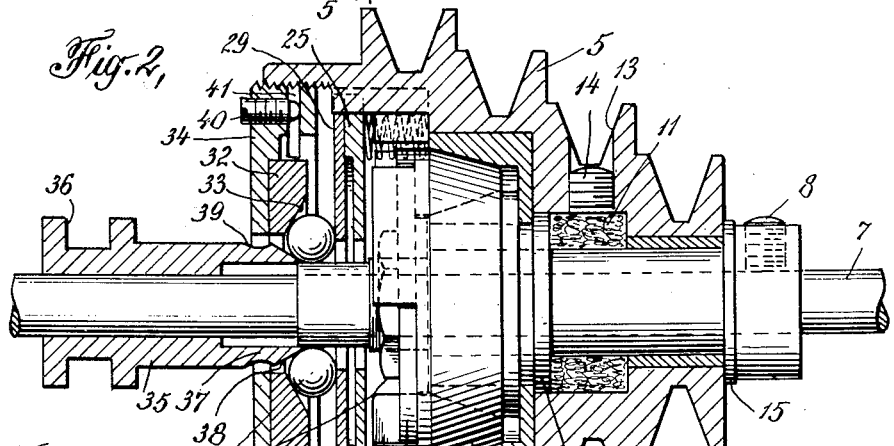
Fig. 2 is a similar sectional view illustrating the position of the parts when the clutch is about to be disengaged.

The operation of the device will be understood readily by reference to Figs. 1 and 2 of the drawings. In Fig. 1, the sleeve 35 has been moved inwardly, thereby lifting the balls 31 into the ball race 39, in which position they bear against the bearing member 32 and the resilient plate 29. If the plate 34 is properly adjusted, the thrust of the balls is transmitted through the resilient plate 29 to the plate 25, thereby forcing the clutch member 23 into engagement with the corresponding clutch member 22. In Fig. 2 of the drawings, the sleeve 35 is withdrawn, permitting the balls 31 to rest upon the end of the sleeve 6. The thrust of the balls is thereby relieved, and the plates 29 and 25 are moved rearwardly by the springs 27, thus permitting the clutch member 23 to move out of engagement with the clutch member 22. It is not necessary to positively withdraw the clutch member 23, as the movement of the parts ensures sufficient withdrawal of the clutch member 23, to prevent further transmission of power when the thrust of the balls 31 is released in the manner described.

Among the particular advantages of the invention are the complete enclosure of the operating parts, with the exception of the sleeve 35 which may be wholly withdrawn without causing disassembling of any of the internal parts of the clutch. The clutch is self-contained and may be withdrawn from the shaft 7 and applied to any shaft of similar size. The mere tightening of the set screw 8 upon the shaft is the only assembling required to permit transmission of power from the shaft through the clutch.

Another particular advantage of the clutch is the transmission of the thrust from the balls through the resilient plate 29. This affords a firm and secure contact between the clutch elements 22 and 23, avoids slippage of the clutch elements, and automatically takes up the slight amount of wear which is incident to the use of the device. The resilient plate 29 furthermore prevents jamming of the mechanism through possible slight variations in adjustment of the plate 34.

Another important advantage of the device is the large proportion of friction surface which it affords. There is in addition to the large amount of surface afforded by the V-shaped elements 22 and 23, frictional engagement between the face of the plate 25 and the ends of the lugs 24 on the clutch element 23. Engagement is provided, therefore, between both the front and rear surfaces of the clutch element 23 which travels with the shaft 7 and sleeve 8, and surfaces moving with the casing 5.

The clutch is quick and positive in operation and may be utilized at full load with high speeds, for example 3,600 R. P. M. The load is picked up evenly and the power is transmitted efficiently through the clutch, which may be released instantaneously by movement of the sleeve 35.

Various changes may be made in the details of construction and arrangement of the parts, without departing from the invention or sacrificing any of the advantages thereof.

I claim:

1. A clutch comprising a casing, co-operating clutch elements within the casing, one of the elements being connected to the casing and the other to means rotatable independently of the casing when the clutch is disengaged, and means for maintaining engagement of the clutch elements including a bearing member supported on the casing, resilient means opposite the bearing member to transmit pressure to the clutch elements, a plurality of balls adapted to engage the bearing member and resilient means, and means for holding the balls in engagement with the bearing member and resilient means.

2. A clutch comprising a casing, co-operating clutch elements within the casing, one of the elements being connected to the casing and the other to means rotatable independently of the casing when the clutch is disengaged, and means for maintaining engagement of the clutch elements including a bearing member supported on the casing, resilient means opposite the bearing member to transmit pressure to the clutch elements, a plurality of balls adapted to engage the bearing member and resilient means, and means for holding the balls in engagement with the bearing member and resilient means, the last mentioned means being movable to release the balls.

3. A clutch comprising a casing, co-operating clutch elements within the casing, one of the elements being connected to the casing and the other to means rotatable independently of the casing when the clutch is disengaged, and means for maintaining engagement of the clutch elements including a bearing member adjustably supported on the casing, resilient means opposite the bearing member to transmit pressure to the clutch elements, a plurality of balls adapted to engage the bearing member and resilient means, and means for holding the balls in engagement with the bearing member and resilient means.

4. A clutch comprising a casing, co-operating clutch elements within the casing, one of the elements being connected to the casing and the other to means rotatable independently of the casing when the clutch is disengaged, and means for maintaining engagement of the clutch elements including a bearing member adjustably supported on the casing, resilient means opposite the bearing member to transmit pressure to the clutch elements, a plurality of balls adapted to engage the bearing member and resilient means, and means for holding the balls in engagement with the bearing member and resilient means, the last mentioned means being movable to release the balls.

5. A clutch comprising a casing, co-operating clutch elements within the casing, one of the elements being connected to the casing and the other to means rotatable independently of the casing when the clutch is disengaged, and means for maintaining engagement of the clutch elements including a bearing member supported on the casing, resilient means opposite the bearing member to transmit pressure to the clutch elements, a plurality of balls adapted to engage the bearing member and resilient means, means for holding the balls in engagement with the bearing member and resilient means, the last mentioned means being movable to release the balls, and means to move the resilient means toward the bearing member when the balls are released.

6. A clutch comprising a casing, co-operating clutch elements within the casing, one of the elements being connected to the casing and the other to means rotatable independently of the casing when the clutch is disengaged, and means for maintaining engagement of the clutch elements including a bearing member adjustably supported on the casing, resilient means opposite the bearing member to transmit pressure to the clutch elements, a plurality of balls adapted to engage the bearing member and resilient means, means for holding the balls in engagement with the bearing member and resilient means, the last mentioned means being movable to release the balls, and means to move the resilient means toward the bearing member when the balls are released.

7. A clutch comprising a casing, a clutch element having a V-shaped recess secured to the casing, a co-operating V-shaped clutch element movable relatively to the first mentioned clutch element and rotatable independently thereof when the clutch is disengaged, and means for maintaining engagement of the clutch elements including a bearing member supported on the casing, resilient means opposite the bearing member to transmit pressure to the clutch elements, a plurality of balls adapted to engage the bearing member and resilient means, and means for holding the balls in engagement with the bearing member and resilient means.

8. A clutch comprising a casing, a clutch element having a V-shaped recess secured to the casing, a co-operating V-shaped clutch element movable relatively to the first mentioned clutch element and rotatable independently thereof when the clutch is disengaged, and means for maintaining engagement of the clutch elements including a bearing member supported on the casing, resilient means opposite the bearing member to transmit pressure to the clutch elements, a plurality of balls adapted to engage the bearing member and resilient means, and means for holding the balls in engagement with the bearing member and resilient means, the last mentioned means being movable to release the balls.

9. A clutch comprising a casing, a clutch element having a V-shaped recess secured to the casing, a co-operating V-shaped clutch element movable relatively to the first mentioned clutch element and rotatable independently thereof when the clutch is disengaged, and means for maintaining engagement of the clutch elements including a bearing member adjustably supported on the casing, resilient means opposite the bearing member to transmit pressure to the clutch elements, a plurality of balls adapted to engage the bearing member and resilient means, and means for holding the balls in engagement with the bearing member and resilient means.

10. A clutch comprising a casing, a clutch element having a V-shaped recess secured to the casing, a co-operating V-shaped clutch element movable relatively to the first mentioned clutch element and rotatable independently thereof when the clutch is disengaged, and means for maintaining engagement of the clutch elements including a bearing member adjustably supported on the casing, resilient means opposite the bearing member to transmit pressure to the clutch elements, a plurality of balls adapted to engage the bearing member and resilient means, and means for holding the balls in engagement with the bearing member and resilient means, the last mentioned means being movable to release the balls.

11. A clutch comprising a casing, a clutch element having a V-shaped recess secured to the casing, a co-operating V-shaped clutch element movable relatively to the first mentioned clutch element and rotatable independently thereof when the clutch is disengaged, and means for maintaining engagement of the clutch elements including a bearing member supported on the casing, resilient means opposite the bearing member to transmit pressure to the clutch elements, a plurality of balls adapted to engage the bearing member and resilient means, means for holding the balls in engagement with the bearing member and resilient means, the last mentioned means being movable to release the balls, and means to move the resilient means toward the bearing member when the balls are released.

12. A clutch comprising a casing, a clutch element having a V-shaped recess secured to the casing, a co-operating V-shaped clutch element movable relatively to the first mentioned clutch element and rotatable independently thereof when the clutch is disengaged, and means for maintaining engagement of the clutch elements including a bearing member adjustably supported on the casing, resilient means opposite the bearing member to transmit pressure to the clutch elements, a plurality of balls adapted to engage the bearing member and resilient means, means for holding the balls in engagement with the bearing member and resilient means, the last mentioned means being movable to release the balls, and means to move the resilient means toward the bearing member when the balls are released.

13. A clutch comprising a casing, co-operating clutch elements within the casing, one of the elements being connected to the casing and the other to means rotatable independently of the casing when the clutch is disengaged, and means for maintaining engagement of the clutch elements including a bearing member supported on the casing, a pair of plates opposite the bearing member, one of the plates being of resilient metal and having a portion thereof spaced from the other plate, a plurality of balls adapted to engage the bearing member and the resilient metal plate, and means for holding the balls in engagement with the bearing member and the resilient metal plate.

14. A clutch comprising a casing, co-operating clutch elements within the casing, one of the elements being connected to the casing and the other to means rotatable independently of the casing when the clutch is disengaged, and means for maintaining engagement of the clutch elements including a bearing member supported on the casing, a pair of plates opposite the bearing member, one of the plates being of resilient metal and having a portion thereof spaced from the other plate, a plurality of balls adapted to engage the bearing member and the resilient metal plate, and means for holding the balls in engagement with the bearing member and the resilient metal plate, the last mentioned means being movable to release the balls.

15. A clutch comprising a casing, co-operating clutch elements within the casing, one of the elements being connected to the casing and the other to means rotatable independently of the casing when the clutch is disengaged, and means for maintaining engagement of the clutch elements including a bearing member adjustably supported on the casing, a pair of plates opposite the bearing member, one of the plates being of resilient metal and having a portion thereof spaced from the other plate, a plurality of balls adapted to engage the bearing member and the resilient metal plate, and means for holding the balls in engagement with the bearing member and the resilient metal plate.

16. A clutch comprising a casing, co-operating clutch elements within the casing, one of the elements being connected to the casing and the other to means rotatable independently of the casing when the clutch is disengaged, and means for maintaining engagement of the clutch elements including a bearing member adjustably supported on the casing, a pair of plates opposite the bearing member, one of the plates being of resilient metal and having a portion thereof spaced from the other plate, a plurality of balls adapted to engage the bearing member and the resilient metal plate, and means for holding the balls in engagement with the bearing member and the resilient metal plate, the last mentioned means being movable to release the balls.

17. A clutch comprising a casing, co-operating clutch elements within the casing, one of the elements being connected to the casing and the other to means rotatable independently of the casing when the clutch is disengaged, and means for maintaining engagement of the clutch elements including a bearing member supported on the casing, a pair of plates opposite the bearing member, one of the plates being of resilient metal and having a portion thereof spaced from the other plate, a plurality of balls adapted to engage the bearing member and the resilient metal plate, means for holding the balls in engagement with the bearing member and the resilient metal plate, the last mentioned means being movable to release the balls, and means to move the pair of plates toward the bearing member when the balls are released.

18. A clutch comprising a casing, co-operating clutch elements within the casing, one of the elements being connected to the casing and the other to means rotatable independently of the casing when the clutch is disengaged, and means for maintaining engagement of the clutch elements including a bearing member adjustably supported on the casing, a pair of plates opposite the bearing member, one of the plates being of resilient metal and having a portion thereof spaced from the other plate, a plurality of balls adapted to engage the bearing member and the resilient metal plate, means for holding the balls in engagement with the bearing member and the resilient metal plate, the last mentioned means being movable to release the balls, and means to move the pair of plates toward the bearing member when the balls are released.

19. A clutch comprising a casing, co-operating clutch elements within the casing, one of the elements being connected to the casing and the other to means rotatable independently of the casing when the clutch is disengaged, and means for maintaining engagement of the clutch elements including a bearing member adjustably supported on the casing, resilient means opposite the bearing member to transmit pressure to the clutch elements, a plurality of balls adapted to engage the bearing member and resilient means, means for holding the balls in engagement with the bearing member and resilient means, and means for locking the bearing member in adjusted position, including a plate supporting the bearing member and having a slot in the threaded periphery thereof, the plate being threadedly engaged with the casing and a screw in the plate adapted to engage one side of the slot to jam the threads.

20. A clutch comprising a casing, co-operating clutch elements within the casing, one of the elements being connected to the casing and the other to means rotatable independently of the casing when the clutch is disengaged, and means for maintaining engagement of the clutch elements including a bearing member adjustably supported on the casing, resilient means opposite the bearing member to transmit pressure to the clutch elements, a plurality of balls adapted to engage the bearing member and resilient means, means for holding the balls in engagement with the bearing member and resilient means, the last mentioned means being movable to release the balls, and means for locking the bearing member in adjusted position including a plate supporting the bearing member and having a slot in the threaded periphery thereof, the plate being threadedly engaged with the casing and a screw in the plate adapted to engage one side of the slot to jam the threads.

WILLIAM F. OCENASEK.